(12) United States Patent
Bertasius et al.

(10) Patent No.: US 12,080,067 B2
(45) Date of Patent: Sep. 3, 2024

(54) CLASSIFYING A VIDEO STREAM USING A SELF-ATTENTION-BASED MACHINE-LEARNING MODEL

(71) Applicant: Meta Platforms, Inc., Menlo Park, CA (US)

(72) Inventors: Gediminas Bertasius, Boston, MA (US); Heng Wang, Mountain View, CA (US); Lorenzo Torresani, Norwich, VT (US)

(73) Assignee: Meta Platforms, Inc., Menlo Park, CA (US)

( * ) Notice: Subject to any disclaimer, the term of this patent is extended or adjusted under 35 U.S.C. 154(b) by 304 days.

(21) Appl. No.: 17/461,755

(22) Filed: Aug. 30, 2021

(65) Prior Publication Data

US 2022/0253633 A1   Aug. 11, 2022

Related U.S. Application Data

(60) Provisional application No. 63/147,137, filed on Feb. 8, 2021.

(51) Int. Cl.
*G06V 10/50* (2022.01)
*G06F 18/21* (2023.01)
(Continued)

(52) U.S. Cl.
CPC .............. *G06V 20/41* (2022.01); *G06F 18/21* (2023.01); *G06N 20/00* (2019.01); *G06V 10/56* (2022.01);
(Continued)

(58) Field of Classification Search
CPC ...... G06V 20/41; G06V 10/56; G06V 10/751; G06V 20/48; G06V 10/759; G06V 10/82; G06V 20/46; G06F 18/21; G06N 20/00
See application file for complete search history.

(56) References Cited

U.S. PATENT DOCUMENTS

| | | | |
|---|---|---|---|
| 10,699,129 B1* | 6/2020 | Jiang | G06V 10/82 |
| 2020/0219245 A1* | 7/2020 | Doggett | G06V 10/764 |
| 2020/0372058 A1* | 11/2020 | Zheng | G06F 16/383 |

FOREIGN PATENT DOCUMENTS

| | | | | |
|---|---|---|---|---|
| CN | 112232164 A | * | 1/2021 | G06K 9/00718 |
| WO | WO-2022164668 A1 | * | 8/2022 | G06F 16/90332 |

OTHER PUBLICATIONS

Ziegelmeier, L., Kirby, M., & Peterson, C. (2012). Locally linear embedding clustering algorithm for natural imagery. arXiv preprint arXiv:1202.4387. (Year: 2012).*

(Continued)

*Primary Examiner* — Bobbak Safaipour
*Assistant Examiner* — Ashley L. Hytrek
(74) *Attorney, Agent, or Firm* — BakerHostetler (57) ABSTRACT

In one embodiment, a method includes accessing a stream of F video frames, where each of the F video frames includes N patches that are non-overlapping, generating an initial embedding vector for each of the N×F patches in the F video frames, generating a classification embedding by processing the generated N×F initial embedding vectors using a self-attention-based machine-learning model that computes a temporal attention and a spatial attention for each of the N×F patches, and determining a class of the stream of video frames based on the generated classification embedding.

20 Claims, 6 Drawing Sheets

(51) Int. Cl.
    G06N 3/045      (2023.01)
    G06N 3/08       (2023.01)
    G06N 20/00      (2019.01)
    G06V 10/56      (2022.01)
    G06V 10/75      (2022.01)
    G06V 10/82      (2022.01)
    G06V 20/40      (2022.01)

(52) U.S. Cl.
    CPC ............ *G06V 10/751* (2022.01); *G06V 20/48* (2022.01); *G06V 10/759* (2022.01)

(56) References Cited

OTHER PUBLICATIONS

Lin, H., Jia, W., Sun, Y., & You, Y. (2019). Spatial-temporal self-attention network for flow prediction. arXiv preprint arXiv:1912.07663. (Year: 2019).*

Dosovitskiy, A., Beyer, L., Kolesnikov, A., Weissenborn, D., Zhai, X., Unterthiner, T., . . . & Houlsby, N. (2020). An image is worth 16×16 words: Transformers for image recognition at scale. arXiv preprint arXiv:2010.11929. (Year: 2020).*

Wang, Y., Yin, H., Chen, T., Liu, C., Wang, B., WO, T., & Xu, J. (2021). Passenger Mobility Prediction via Representation Learning for Dynamic Directed and Weighted Graph. arXiv preprint arXiv:2101.00752. (Year: 2021).*

Tran D., et al., "Video Classification with Channel-Separated Convolutional Networks," Proceedings of the IEEE/CVF International Conference on Computer Vision (ICCV), 2019, pp. 5551-5560.

Vaswani A., et al., "Attention Is All You Need," Advances in Neural Information Processing Systems, 2017, pp. 5998-6008.

Wang H., et al., "Axial-DeepLab: Stand-Alone Axial-Attention for Panoptic Segmentation," In Computer Vision—ECCV 2020—16th European Conference, 2020, 19 pages.

Wang H., et al., "Video Modeling with Correlation Networks," In Proceedings of the IEEE/CVF Conference on Computer Vision and Pat-tern Recognition (CVPR), Jun. 2020, pp. 352-361.

Wang X., et al., "Non-Local Neural Networks," Proceedings of the IEEE Conference on Computer Vision and Pattern Recognition (CVPR), 2018, pp. 7794-7803.

Weissenborn D., et al., "Scaling Autoregressive Video Models," In 8th International Conference on Learning Representations, ICLR, 2020, 24 pages.

Wu C., et al., "Long-Term Feature Banks for Detailed Video Understanding," In Proceedings of the IEEE/CVF Conference onComputer Vision and Pattern Recognition, 2019, pp. 284-293.

Xie S., et al., "Rethinking Spatiotemporal Feature Learning: Speed-Accuracy Trade-offs in Video Classification," Proceedings of the European Conference on Computer Vision (ECCV), 2018, pp. 318-335, DOI: 10.1007/978-3-030-01267-0_19.

Yang Z., et al., "BERT Representations for Video Question Answering," In The IEEE Winter Conference on Applications of Computer Vision, 2020, pp. 1556-1565.

Zhao H., et al., "Exploring Self-Attention for Image Recognition," Proceedings of the IEEE/CVF Conference on Computer Vision and Pattern Recognition (CVPR), 2020, pp. 10076-10085.

Zhou L., et al., "End-to-End Dense Video Captioning with Masked Trans-former," In Proceedings of the IEEE Conference on Computer Vision and Pattern Recognition, 2018, pp. 8739-8748.

Ba J.L., et al., "Layer Normalization," arXiv preprint arXiv: 1607.06450, 2016, 14 pages.

Bello I., et al., "Attention Augmented Convolutional Networks," In 2019 IEEE/CVF International Conference onComputer Vision, ICCV, 2019, pp. 3286-3295.

Bertasius G., et al., "Classifying, Segmenting, and Tracking Object Instances in Video with Mask Propagation," Proceedings of the IEEE/CVF Conference on Computer Vision and Pattern Recognition (CVPR), Jun. 2020, pp. 9739-9748.

Bertasius G, et al., "Is Space-Time Attention All You Need for Video Understanding?," Proceedings of the 38th International Conference on Machine Learning, PMLR 139, 2021, 11 pages.

Brown T.B., et al., "Language Models are Few-Shot Learners," arXiv:2005.14165, 2020, 75 pages.

Carion N., et al., "End-to-End Object Detection with Transformers," In European Conference Computer Vision (ECCV), 2020, 26 pages.

Carreira J., et al., "A Short Note about Kinetics-600," arXiv:1808.01340, CoRR, 2018, 6 pages.

Carreira J., et al., "Quo Vadis, Action Recognition? A New Model and The Kinetics Dataset," Proceedings of the IEEE Conference on Computer Vision and Pattern Recognition (CVPR), 2017, pp. 6299-6308.

Chen M.X., et al., "The Best of Both Worlds: Combining Recent Advances in Neural Machine Translation," In Proceedings of the 56th Annual Meeting of the Association for Computational Linguistics. Association for Computational Linguistics, 2018, pp. 76-86.

Chen Y., et al., "A2-Nets: Double Attention Networks," In Advances in Neural Information Processing Systems 31, 2018, 10 pages.

Chen Y., et al., "Drop an Octave: Reducing Spatial Redundancy in Convolutional Neural Networks with Octave Convolution," Proceedings of the IEEE/CVF International Conference on Computer Vision (ICCV), Oct. 2019, pp. 3435-3444.

Chen Y., et al., "Graph-Based Global Reasoning Networks," In Proceedings of the IEEE/CVF Conference on Computer Vision and Pattern Recognition (CVPR), Jun. 2019, pp. 433-442.

Chen Y., et al., "Multi-Fiber Networks for Video Recognition," Proceedings of the European Conference on Computer Vision (ECCV), 2018, pp. 352-367.

Child R., et al., "Generating Long Sequences with Sparse Transformers," arXiv:1904.10509, CoRR, 2019, 10 pages.

Cordonnier J-B., et al., "On the Relationship between Self-Attention and Convolutional Layers," In 8th International Conference on Learning Representations, Apr. 26-30, 2020, 18 pages.

Dai Z., et al., "Transformer-XL: Attentive Language Models Beyond A Fixed-Length Context," arXiv preprint arXiv:1901.02860, Jun. 2, 2019, 20 pages.

Devlin J., et al., "BERT: Pre-Training of Deep Bidirectional Transformers for Language Understanding," In Proceedings of the 2019Conference of the North American Chapter of the Association for ComputationalLinguistics: Human Language Tech-nologies, vol. 1 (Long and Short Papers), 2019, 16 pages.

Dosovitskiy A., et al., "An Image is Worth 16×16 Words: Transformers for Image Recognition at Scale," CoRR, 2020, 22 pages.

Feichtenhofer C., et al., "SlowFast Networks for Video Recognition," Proceedings of the IEEE/CVF International Conference on Computer Vision (ICCV), 2019, pp. 6202-6211.

Feichtenhofer C., "X3D: Expanding Architectures for Efficient Video Recognition," Proceedings of the IEEE/CVF Conference on Computer Vision and Pattern Recognition (CVPR), 2020, pp. 200-210.

Gavrilyuk K., et al., "Actor-Transformers for Group Activity Recognition," In 2020 IEEE/CVF Conference on Computer Visionand Pattern Recognition, CVPR, 2020, pp. 839-848.

Girdhar R., et al., "ActionVLAD: Learning Spatio-Temporal Aggregation for Action Classification," Proceedings of the IEEE Conference on Computer Vision and Pattern Recognition (CVPR), 2017, pp. 971-980.

Girdhar R., et al., "Video Action Transformer Network," In IEEE Conference on Computer Vision and Pattern Recognition, CVPR, 2019, pp. 244-253.

Goyal R., et al., "The "Something Something" Video Database for Learning and Evaluating Visual Common Sense," Proceedings of the IEEE International Conference on Computer Vision (ICCV), 2017, pp. 5842-5850.

Ho J., et al., "Axial Attention in Multidimensional Transformers," arXiv:1912.12180, CoRR, 2019, 11 pages.

Hu H., et al., "Relation Net-works for Object Detection," In 2018 IEEE Conference on Computer Vision and Pattern Recognition, CVPR, 2018, pp. 3588-3597.

Jiang H., et al., "STM: Spatiotemporal and Motion Encoding for Action Recognition," Proceedings of the IEEE/CVF International Conference on Computer Vision (ICCV), Oct. 2019, pp. 2000-2009.

(56) References Cited

OTHER PUBLICATIONS

Kwon H., et al., "Motionsqueeze: Neural Motion Feature Learning for Video Understanding," European Conference on Computer Vision (ECCV), 2020, 17 pages.
Le H., et al., "Multimodal Transformer Networks for End-to-End Video-Grounded Dialogue Systems," In Proceedings of the 57th Annual Meeting of the Association for Computational Linguistics, 2019, pp. 5612-5623.
Li L., et al., "HERO: Hierarchical Encoder for Video+Language Omni-Representation Pre-Training," arXiv preprint arXiv:2005.00200, 2020, 21 pages.
Li Y., et al., "Resound: Towards Action Recognition without Representation Bias," Proceedings of the European Conference on Computer Vision (ECCV), Sep. 2018, pp. 513-528.
Li Y., et al., "TEA: Temporal Excitation and Aggregation for Action Recognition," Proceedings of the IEEE/CVF Conference on Computer Vision and Pattern Recognition (CVPR), Jun. 2020, pp. 909-918.
Lin J., et al., "TSM: Temporal Shift Module for Efficient Video Understanding," Proceedings of the IEEE/CVF International Conference on Computer Vision (ICCV), 2019, pp. 7083-7093.
Maaten L.V.D., et al., Visualizing Data Using t-SNE, Journal of Machine Learning Research, 2008, vol. 9, pp. 2579-2605.
Ott M., et al., "Scaling Neural Machine Translation," In Proceedings of the Third Conference on Machine Translation: Research Papers, arXiv:1806.00187v3, 2018, 9 pages.
Parmar N., et al., "Image Transformer," Proceedings of the 35th International Conference on Machine Learning, 2018, PMLR 80, pp. 4055-4064.
Qiu Z., et al., "Learning Spatio-Temporal Representation with Local and Global Diffusion," Proceedings of the IEEE/CVF Conference on Computer Vision and Pattern Recognition (CVPR), 2019, pp. 12056-12065.
Radford A., et al., "Language Models are Unsupervised Multitask Learners," 2019, 24 pages.
Radford A., et al., "Improving Language Understanding by Generative Pre-Training," 2018, 12 pages.
Raffel C., et al., "Exploring the Limits of Transfer Learning with a Unified Text-to-Text Transformer," arXiv preprint arXiv: 1910.10683, 2019, 67 pages.
Ramachandran P., et al., "Stand-Alone Self-Attention in Vision Models," In Advances in Neural Information Pro-cessing Systems, 2019, pp. 68-80.
Russakovsky O., et al., "ImageNet Large Scale Visual Recognition Challenge," International Journal of Computer Vision, arXiv:1409.0575, 2014, 43 pages.
Sevilla-Lara L., "Only Time Can Tell: Discovering Temporal Data for Temporal Modeling," In Proceedings of the IEEE/CVF Winter Conference on Applications of Computer Vision (WACV), Jan. 2021, pp. 535-544.
Simonyan K., et al., "Very Deep Convolutional Networks for Large-Scale Image Recognition," arXiv: 1409.1556, Published as a Conference Paper at ICLR, Apr. 10, 2015, 14 pages.
Stroud J., et al., "D3D: Distilled 3D Networks for Video Action Recognition," Proceedings of the IEEE/CVF Winter Conference on Applications of Computer Vision (WACV), Mar. 2020, pp. 625-634.
Sun C., et al., "VideoBERT: A Joint Model for Video and Language Representation Learning," Proceedings of the IEEE/CVF International Conference on Computer Vision (ICCV), 2019, pp. 7464-7473.
Szegedy C., et al., "Going Deeper with Convolutions," 2015 IEEE Conference on Computer Vision and Pattern Recognition (CVPR), Oct. 15, 2015, 9 Pages.
Teed Z., et al., "RAFT: Recurrent All-Pairs Field Transforms for Optical Flow," In Computer Vision—ECCV 2020—16th European Conference, Proceedings, Part II, Aug. 23-28, 2020, 17 pages.
Touvron H., et al., "Training Data-Efficient Image Transformers & Distillation through Attention," arXiv preprint arXiv:2012.12877, 2020, 22 pages.
Tran D., et al., "A Closer Look at Spatiotemporal Convolutions for Action Recognition," Proceedings of the IEEE Conference on Computer Vision and Pattern Recognition (CVPR), 2018, pp. 6450-6459.
Lin H., et al., "Spatial-Temporal Self-Attention Network for Flow Prediction," Arxiv.Org, Dec. 13, 2019, 8 pages.
Wang Y., et al., "Passenger Mobility Prediction via Representation Learning for Dynamic Directed and Weighted Graph," Arxiv.Org, Jan. 4, 2021, vol. 1, No. 1, 24 pages.
Wu X., et al., "Hierarchically Structured Transformer Networks for Fine-Grained Spatial Event Forecasting," Proceedings of the 28th ACM Joint Meeting on European Software Engineering, Apr. 20, 2020, pp. 2320-2330.
Zhang J., et al., "Video Captioning With Object-Aware Spatio-Temporal Correlation and Aggregation," IEEE Transactions on Image Processing, Apr. 27, 2020, vol. 29, pp. 6209-6222.

\* cited by examiner

Frame $t - \delta$  Frame $t$  Frame $t + \delta$

CLASSIFYING A VIDEO STREAM USING A SELF-ATTENTION-BASED MACHINE-LEARNING MODEL

PRIORITY

This application claims the benefit under 35 U.S.C. § 119(e) of U.S. Provisional Patent Application No. 63/147,137, filed 8 Feb. 2021, which is incorporated herein by reference.

TECHNICAL FIELD

This disclosure generally relates to machine-learning technologies, and in particular relates to classifying a video stream using a machine-learning model.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for classifying a stream of video frames using a self-attention-based machine-learning model, such as a Transformer network. The classification may be done based on the context of the stream of video frames. For various video processing tasks, two-dimensional or three-dimensional convolutions have been considered as the core operators for spatiotemporal feature learning. Convolutional models have a few inherent limitations for video analysis. First, while their strong inductive biases (e.g., local connectivity and translation equivariance) are undoubtedly beneficial on small training sets, those strong inductive biases may limit the expressivity of the model in settings where large amount of data is available and "all" can be learned from examples. Compared to convolutional neural networks (CNNs), a self-attention-based machine-learning model may impose less restrictive inductive biases. The self-attention-based machine-learning model may be used for a broader tasks and be better suited to modern big-data regimes where there is less need for strong inductive priors. Second, while convolutional kernels are specifically designed to capture short-range spatiotemporal information, the convolutional kernels cannot model dependencies that extend beyond the receptive field. While deep stacks of convolutions naturally extend the receptive field, these strategies are inherently limited in capturing long-range dependencies by means of aggregation of shorter-range information. Conversely, the self-attention mechanism can be applied to capture both local as well as global long-range dependencies by directly comparing feature activations at all space-time locations, much beyond the receptive field of traditional convolutional filters. Finally, despite the advances in GPU hardware acceleration, training deep CNNs remains very costly, especially when applied to high-resolution and long videos. The self-attention-based machine-learning model may be faster in both training and inference compared to CNNs. Compared to the established paradigm of convolution-based video architecture, the self-attention-based machine-learning model follows a radically different design. Yet, the self-attention-based machine-learning model achieves accuracy comparable, and in some cases superior, to the state-of-the-art in this field. Experiment results show that the proposed self-attention-based machine-learning model may be used for long-range modeling of videos spanning many minutes.

In particular embodiments, a computing device may access a stream of F video frames. Each of the F video frames may comprise N patches that are non-overlapping and of an identical size. The computing device may generate an initial embedding vector corresponding to each of the N×F patches in the F video frames. To generate an initial embedding vector corresponding to a patch, the computing device may create a color embedding vector by multiplying color information of the patch with a color information embedding matrix, and add a positional embedding vector to the color embedding vector. The color information embedding matrix may be trained during a training procedure. The positional embedding vector may be trained during the training procedure. The computing device may provide the generated N×F initial embedding vectors to a self-attention-based machine-learning model as input. In particular embodiments, the self-attention-based machine-learning model may be a Transformer network. The self-attention-based machine-learning model may comprise L serial encoding blocks. The computing device may generate an embedding vector corresponding to a particular patch in the particular video frame at encoding block l of the L encoding blocks based on embedding vectors generated at a preceding encoding block of the L encoding blocks. For generating embedding vectors at a first encoding block of the L encoding blocks, the computing device may use the initial embedding vectors. To generate an embedding vector corresponding to the particular patch in the particular video frame at encoding block l of the L encoding blocks, the computing device may (1) compute a temporal attention based on comparisons between the embedding vector corresponding to the particular patch generated at encoding block l-1 of the L encoding blocks and embedding vectors corresponding to one or more patches in one or more other video frames generated at encoding block l-1 and (2) compute a spatial attention based on comparisons between the embedding vector corresponding to the particular patch generated at encoding block l-1 and embedding vectors corresponding to one or more other patches in the particular video frame generated at encoding block l-1. In particular embodiments, the one or more patches in the one or more other video frames may comprise one or more patches at a spatial location of the particular patch in their corresponding video frames. In particular embodiments, the L encoding blocks may be multi-headed. The computing device may generate an embedding vector corresponding to the particular patch based on the computed temporal attention and the computed spatial attention. To generate the embedding vector corresponding to the particular patch based on the computed temporal attention and the computed spatial attention, the computing device may process the computed temporal attention and the computed spatial attention using a multilayer perceptron (MLP). The computing device may generate a classification embedding by taking a layer normalization on one or more of embedding vectors generated at a last encoding block of the L encoding blocks. The computing device may determine a class of the stream of video frames based on the generated classification embedding. To determine the class of the stream of video frames, the computing device may process the classification embedding using an MLP.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
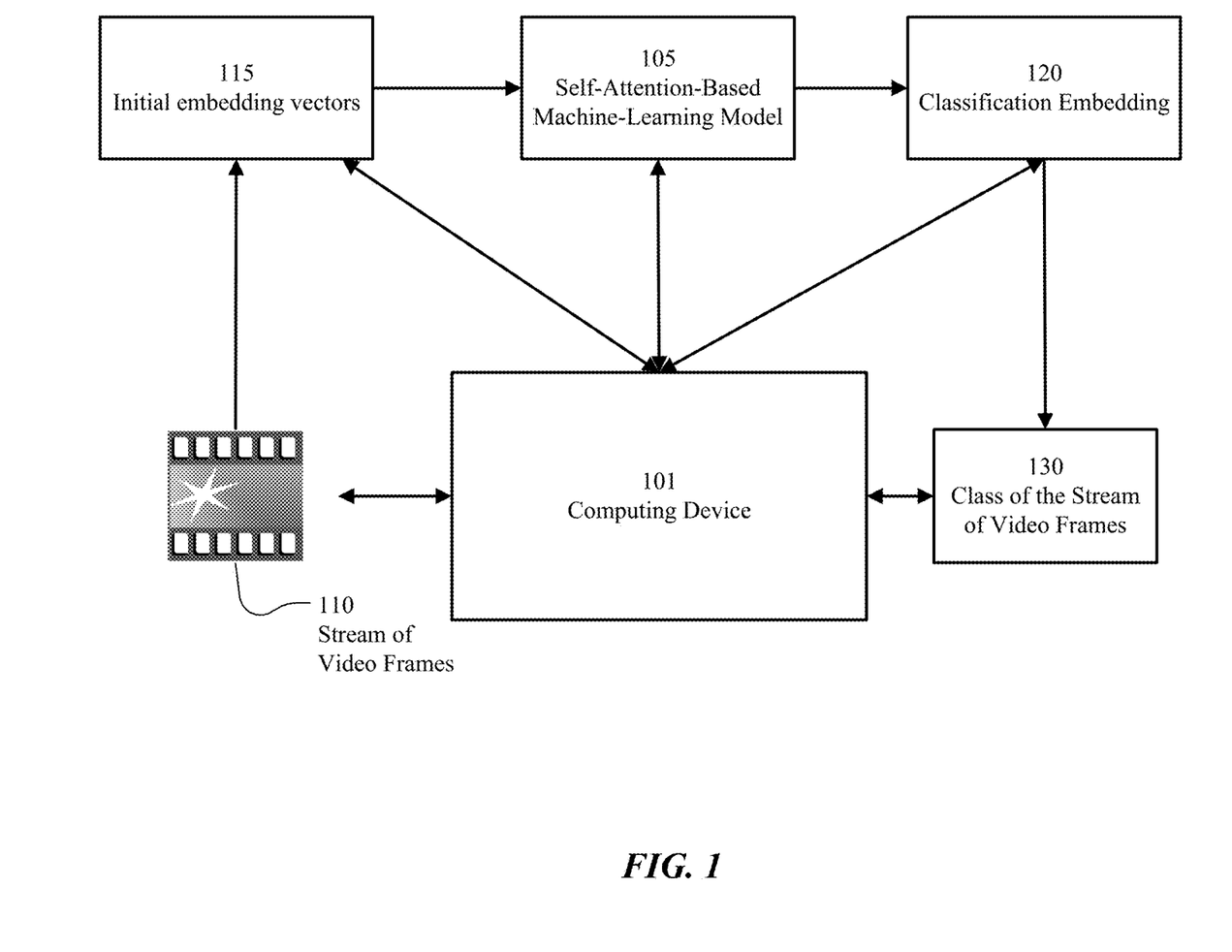
FIG. 1 illustrates an example system architecture for classifying a stream of a video frames using a self-attention-based machine-learning model.

FIG. 1 illustrates an example system architecture for classifying a stream of a video frames using a self-attention-based machine-learning model. A computing device 101 may access a stream of F video frames 110. Each of the video frames 110 may comprise non-overlapping and identical-sized N patches. The computing device 101 may generate an initial embedding vector 115 for each of the N×F patches. The computing device 101 may provide the generated initial embedding vectors 115 to a self-attention-based machine-learning model 105. The self-attention-based machine-learning model 105 may comprise an encoder with L serial encoding blocks. At each encoding block of the L encoding blocks, the computing device 101 may generate a layer-specific embedding vector corresponding to each of the N×F patches by computing a temporal attention and a spatial attention for the patch based on embedding vectors generated at a previous encoding block. The self-attention-based machine-learning model 105 may produce a classification embedding 120 based on one or more of embedding vectors generated at a last encoding block of the L encoding blocks. The computing device 101 may determine a class 130 of the stream of video frames 110 based on the generated classification embedding 120. Although this disclosure describes classifying a stream of video frames using a self-attention-based machine-learning model in a particular manner, this disclosure contemplates classifying a stream of video frames using a self-attention-based machine-learning model in any suitable manner.

In particular embodiments, the computing device 101 may access a stream of F video frames 110. Each of the F video frames 110 may comprise N patches that are non-overlapping and of an identical size. As an example and not by way of limitation, the computing device 101 may sample F video frames 110 from a longer stream of video frames. Each frame may comprise Red, Green and Blue (RGB) channels. A size of a frame may be H×W. The computing device 101 may decompose each frame into N non-overlapping patches, each of size P×P, such that the N patches span the entire frame, i.e., $N = HW/P^2$. Although this disclosure describes accessing a stream of video frames, each comprising N patches in a particular manner, this disclosure contemplates accessing a stream of video frames, each comprising N patches in any suitable manner.

In particular embodiments, the computing device 101 may generate an initial embedding vector 115 corresponding to each of the N×F patches in the F video frames. To generate an initial embedding vector 115 corresponding to a patch, the computing device may create a color embedding vector by multiplying color information of the patch with a color information embedding matrix, and add a positional embedding vector to the color embedding vector. The color information embedding matrix may be trained during a training procedure. The positional embedding vector may be trained during the training procedure. As an example and not by way of limitation the computing device 101 may flatten the N×F patches into vectors $x_{(p,t)} \in \mathbb{R}^{3P^2}$ with $p = 1, \ldots, N$ denoting spatial locations and $t = 1, \ldots, F$ depicting an index over frames. The computing device 101 may linearly map each patch $x_{(p,t)}$ into an embedding vector $z_{(p,t)}^{(0)} \in \mathbb{R}^D$ by means of a learnable color information embedding matrix $E \in \mathbb{R}^{D \times 3P^2}$ such that $z_{(p,t)}^{(0)} = Ex_{(p,t)} + e_{(p,t)}^{pos}$, where $e_{(p,t)}^{pos} \in \mathbb{R}^D$ may represent a learnable positional embedding vector added to encode the spatiotemporal position of each patch. The resulting sequence of embedding vectors $z_{(p,t)}^{(0)}$ for $p = 1, \ldots, N$, and $t = 1, \ldots, F$ represents the initial embedding vectors that may be provided to the self-attention-based machine-learning model 105 as input. In particular embodiments, the computing device 101 may add a special learnable vector $z_{(0,0)}^{(0)} \in \mathbb{R}^D$ representing the embedding of the classification token in the first position of the sequence. An encoding of the classification token in a final encoding block may be taken as the global representation of the stream of video frames 110 and may be used for classification. Although this disclosure describes generating an initial embedding vector corresponding to each of the N×F patches in a particular manner, this disclosure contemplates generating an initial embedding vector corresponding to each of the N×F patches in any suitable manner.

Figure 2:
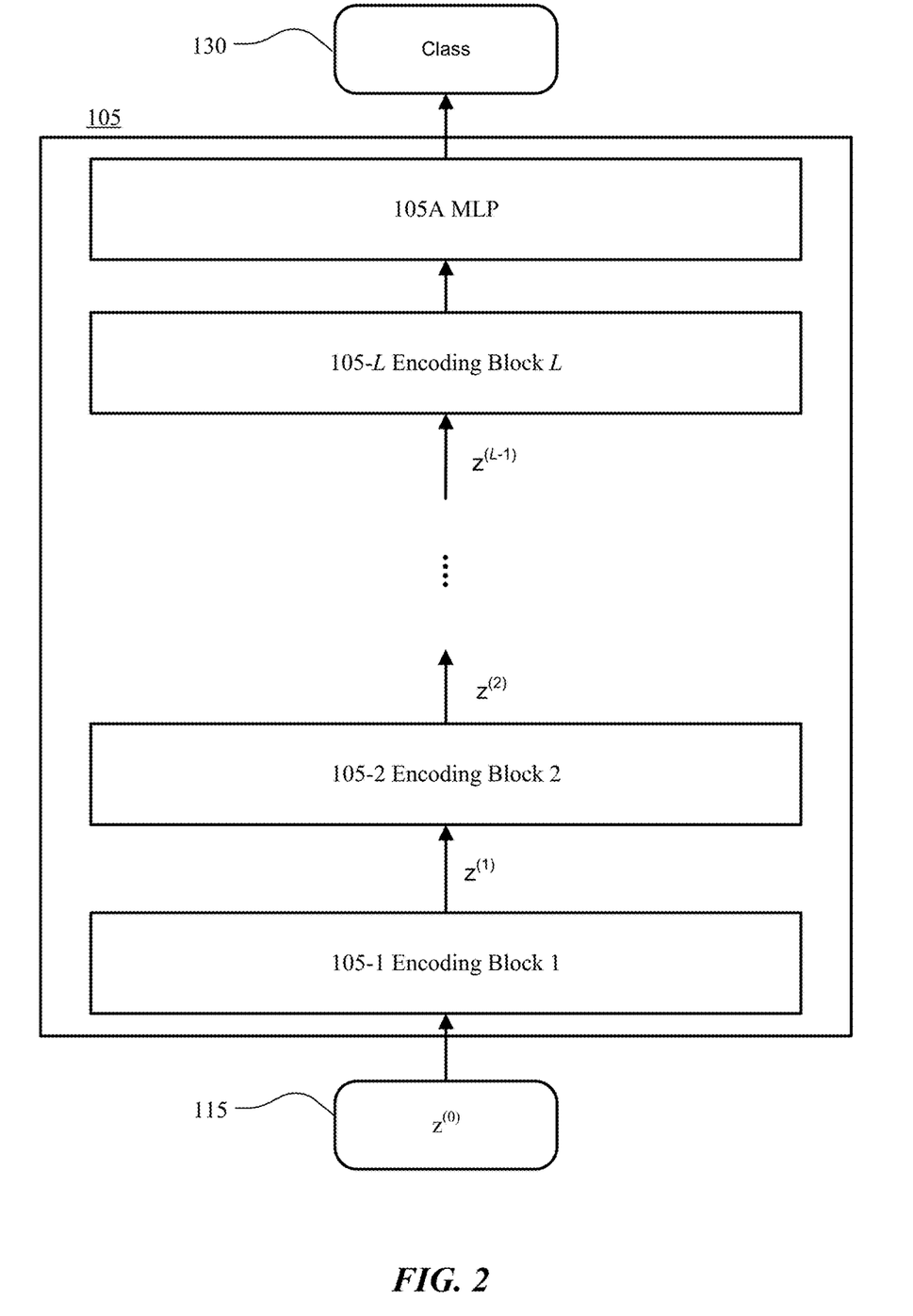
FIG. 2 illustrates an example logical architecture of a self-attention-based machine-learning model.

In particular embodiments, the computing device 101 may provide the generated N×F initial embedding vectors 115 to the self-attention-based machine-learning model 105 as input. In particular embodiments, the self-attention-based machine-learning model 105 may be a Transformer network. The self-attention-based machine-learning model 105 may comprise L serial encoding blocks. FIG. 2 illustrates an example logical architecture of a self-attention-based machine-learning model. The self-attention-based machine-learning model 105 may comprise L serial encoding blocks. Encoding block 1 of the L encoding blocks may access layer-specific embedding vectors $z^{(l-1)}$ generated by encoding block l-1 of the L encoding blocks and generate layer-specific embedding vectors $z^{(l)}$ based on accessed embedding vectors $z^{(l-1)}$. The self-attention-based machine-learning model 105 may also comprise an MLP may predict a class of the stream of video frames 110 based on a classification embedding 120. Although this disclosure describes a particular architecture of the self-attention-based machine-learning model, this disclosure contemplates any suitable architecture of the self-attention-based machine-learning model.

In particular embodiments, the computing device 101 may generate an embedding vector corresponding to a particular patch in the particular video frame at encoding block 1 of the L encoding blocks based on embedding vectors generated at a preceding encoding block of the L encoding blocks. For generating embedding vectors at a first encoding block of the L encoding blocks, the computing device may use the initial embedding vectors. As an example and not by way of limitation, illustrated in FIG. 2, the computing device 101 may provide the generated N×F initial embedding vectors 115 to a first encoding block 105-1 of the self-attention-based machine-learning model 105. The first encoding block 105-1 may generate layer-specific embedding vectors $z^{(1)}$ corresponding to the N×F patches based on the accessed initial embedding vectors 115. The generated layer-specific embedding vectors $z^{(1)}$ may be provided to a second encoding block 105-2. The second encoding block 105-2 may generate layer-specific embedding vectors $z^{(2)}$ corresponding to the N×F patches based on the accessed embedding vectors $z^{(1)}$. A last encoding block 105-L may receive embedding vectors $z^{(L-1)}$ generated by a preceding encoding block. The last encoding block 105-L may generate layer-specific embedding vectors $z^{(L)}$ corresponding to the N×F patches based on the accessed embedding vectors $z^{(L-1)}$. Although this disclosure describes generating layer-specific embedding vectors corresponding to the N×F patches in a particular manner, this disclosure contemplates generating layer-specific embedding vectors corresponding to the N×F patches in any suitable manner.

In particular embodiments, the computing device 101 may compute a query/key/value vector for each patch at block 1 from the representation $z_{(p,t)}^{(l-1)}$ encoded by the preceding block l-1:

$$q_{(p,t)}^{(l,a)} = W_Q^{(l,a)} LN(z_{(p,t)}^{(l-1)}) \in \mathbb{R}^{D_h}$$

$$k_{(p,t)}^{(l,a)} = W_K^{(l,a)} LN(z_{(p,t)}^{(l-1)}) \in \mathbb{R}^{D_h}$$

$$v_{(p,t)}^{(l,a)} = W_V^{(l,a)} LN(z_{(p,t)}^{(l-1)}) \in \mathbb{R}^{D_h}$$

where LN( ) denotes LayerNorm, a=1, ..., $\mathcal{A}$ is an index over multiple attention heads, and $\mathcal{A}$ denotes the total number of attention heads. The latent dimensionality for each attention head is set to $D_h = D/\mathcal{A}$. In particular embodiments, the L encoding blocks may be multi-headed. Self-attention weights may be computed via dot-product. In particular embodiments, the computing device 101 may compute a joint space-time attention for query patch (p,t). The self-attention weights $\alpha_{(p,t)}^{(l,a)} \in \mathbb{R}^{NF+1}$ for query patch (p,t) may be given by:

$$\alpha_{(p,t)}^{(l,a)} = SM\left(\frac{q_{(p,t)}^{(l,a)T}}{\sqrt{D_h}} \cdot \left[k_{(0,0)}^{(l,a)} \{k_{(p',t')}^{(l,a)}\}_{p'=1,\cdots,N,t'=1,\cdots,F}\right]\right)$$

where SM denotes the softmax activation function. When attention is computed over one dimension only (e.g., spatial-only or temporal-only), the computation may be significantly reduced. For example, in the case of spatial attention, only N+1 query-key comparisons are made, using exclusively keys from the same frame as the query:

$$\alpha_{(p,t)}^{(l,a)space} = SM\left(\frac{q_{(p,t)}^{(l,a)T}}{\sqrt{D_h}} \cdot \left[k_{(0,0)}^{(l,a)} \{k_{(p',t)}^{(l,a)}\}_{p'=1,\cdots,N}\right]\right)$$

The encoding $z_{(p,t)}^{(l)}$ at block 1 may be obtained by first computing the weighted sum of value vectors using self-attention coefficients from each attention head:

$$s_{(p,t)}^{(l,a)} = \alpha_{(p,t),(0,0)}^{(l,a)} v_{(0,0)}^{(l,a)} + \sum_{p'=1}^{N} \sum_{t'=1}^{F} \alpha_{(p,t),(p',t')}^{(l,a)} v_{(p',t')}^{(l,a)}$$

The concatenation of these vectors from all heads may be projected and passed through an MLP, using residual connections after each operation:

$$z'^{(l)}_{(p,t)} = W_O \begin{bmatrix} s_{(p,t)}^{(l,1)} \\ \vdots \\ s_{(p,t)}^{(l,\mathcal{A})} \end{bmatrix} + z_{(p,t)}^{(l-1)}$$

$$z_{(p,t)}^{(l)} = MLP(LN(z'^{(l)}_{(p,t)})) + z'^{(l)}_{(p,t)}$$

Although this disclosure describes generating an embedding vector $z_{(p,t)}^{(l)}$ for query patch (p,t) at encoding block 1 in a particular manner, this disclosure contemplates generating an embedding vector $z_{(p,t)}^{(l)}$ for query patch (p,t) at encoding block 1 in any suitable manner.

Figure 3A:
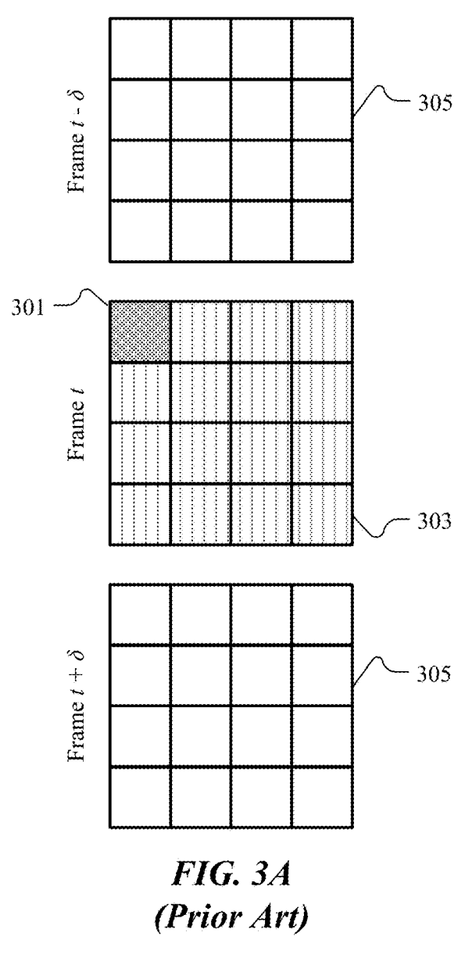
FIGS. 3A-3C illustrate example space-time self-attention schemes.
Figure 3B:
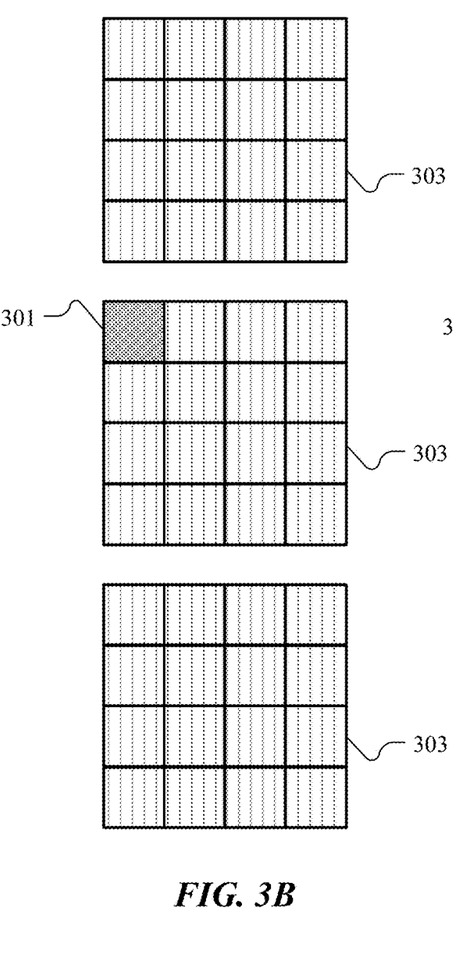
Figure 3C:
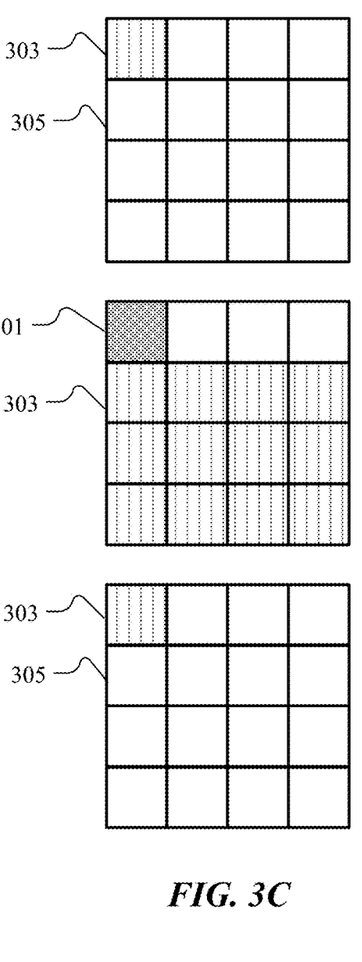

In particular embodiments, to generate an embedding vector corresponding to the particular patch in the particular video frame at encoding block 1 of the L encoding blocks, the computing device 101 may (1) compute a temporal attention based on comparisons between the embedding vector corresponding to the particular patch generated at encoding block l-1 of the L encoding blocks and embedding vectors corresponding to one or more patches in one or more other video frames generated at encoding block l-1 and (2) compute a spatial attention based on comparisons between the embedding vector corresponding to the particular patch generated at encoding block l-1 and embedding vectors corresponding to one or more other patches in the particular video frame generated at encoding block l-1. In particular embodiments, the one or more patches in the one or more other video frames may comprise one or more patches at a spatial location of the particular patch in their corresponding video frames. FIGS. 3A-3C illustrate example space-time self-attention schemes. In the examples illustrated in FIGS. 3A-3C, the computing device 101 computes an embedding vector $z_{(p,t)}^{(l)}$ corresponding to a patch 301 of frame t, which is indicated by dark dots. The patches 303 indicated by vertical stripes are used for computing either a spatial attention or a temporal attention for the patch 301. The empty patches 305 are not used for computing either the spatial attention or the temporal attention for the patch 301. FIG. 3A illustrates a space attention only scheme, where the temporal attention is not calculated. This scheme was known prior to the invention disclosed in this application. The space attention only scheme illustrated in FIG. 3A neglects to capture temporal dependencies across frames. The experiment results show that this approach leads to degraded classification accuracy compared to full spatiotemporal attention. FIG. 3B illustrates a joint space-time attention scheme. In this scheme, a spatiotemporal attention may be calculated based on comparisons between the embedding vector $z_{(p,t)}^{(l-1)}$ corresponding to the patch 301 generated at encoding block l-1 and embedding vectors $z_{(p',t)}^{(l-1)}$ corresponding to other patches 303 in the frame t and embedding vectors $z_{(p',t')}^{(l-1)}$ corresponding to patches 303 in the frame t+δ and the frame t−δ generated at encoding block l-1. As discussed before, this scheme is computationally expensive. A more efficient scheme for spatiotemporal attention, named "divided space-time attention", is illustrated in FIG. 3C, where temporal attention and spatial attention are separately applied one after the other. For divided attention, within each block l, the computing device 101 may first compute a temporal attention by comparing each patch (p,t) with all the patches at the same spatial location in the other frames:

$$\alpha_{(p,t)}^{(l,a)time} = SM\left(\frac{q_{(p,t)}^{(l,a)T}}{\sqrt{D_h}} \cdot \left[k_{(0,0)}^{(l,a)} \{k_{(p,t')}^{(l,a)}\}_{t'=1,\cdots,F}\right]\right)$$

The encoding $z'_{(p,t)}^{(l)time}$ time using temporal attention is then fed back for spatial attention computation instead of being passed to the MLP. In other words, new key/query/value vectors may be obtained from $z'z_{(p,t)}^{(l)time}$ and spatial attention is then computed using an above equation for $\alpha_{(p,t)}^{(l,a)space}$. Finally, the resulting vector $z'_{(p,t)}^{(l)space}$ is passed to the MLP to compute the final encoding $z_{(p,t)}^{(l)}$ of the patch (p,t) at block l. For the divided attention, distinct query/key/value matrices $W_{Q^{time}}^{(l,a)}$, $W_{K^{time}}^{(l,a)}$, $W_{V^{time}}^{(l,a)}$, and $W_{Q^{space}}^{(l,a)}$, $W_{K^{space}}^{(l,a)}$, $W_{V^{space}}^{(l,a)}$ may be trained over the time and space dimensions. While the joint spatiotemporal attention scheme depicted in FIG. 3B may perform (NF+1) comparisons per patch, the divided attention scheme may only require (N+F+2) comparisons per patch. The experiment results show that this space-time factorization is not only more efficient but it also leads to improved classification accuracy. In particular embodiments, the computing device 101 may compute the spatial attention before the temporal attention within each block. Although this disclosure describes computing divided space-time attention at each block of the L encoding blocks in a particular manner, this disclosure contemplates computing divided space-time attention at each block of the L encoding blocks in any suitable manner.

Figure 4:
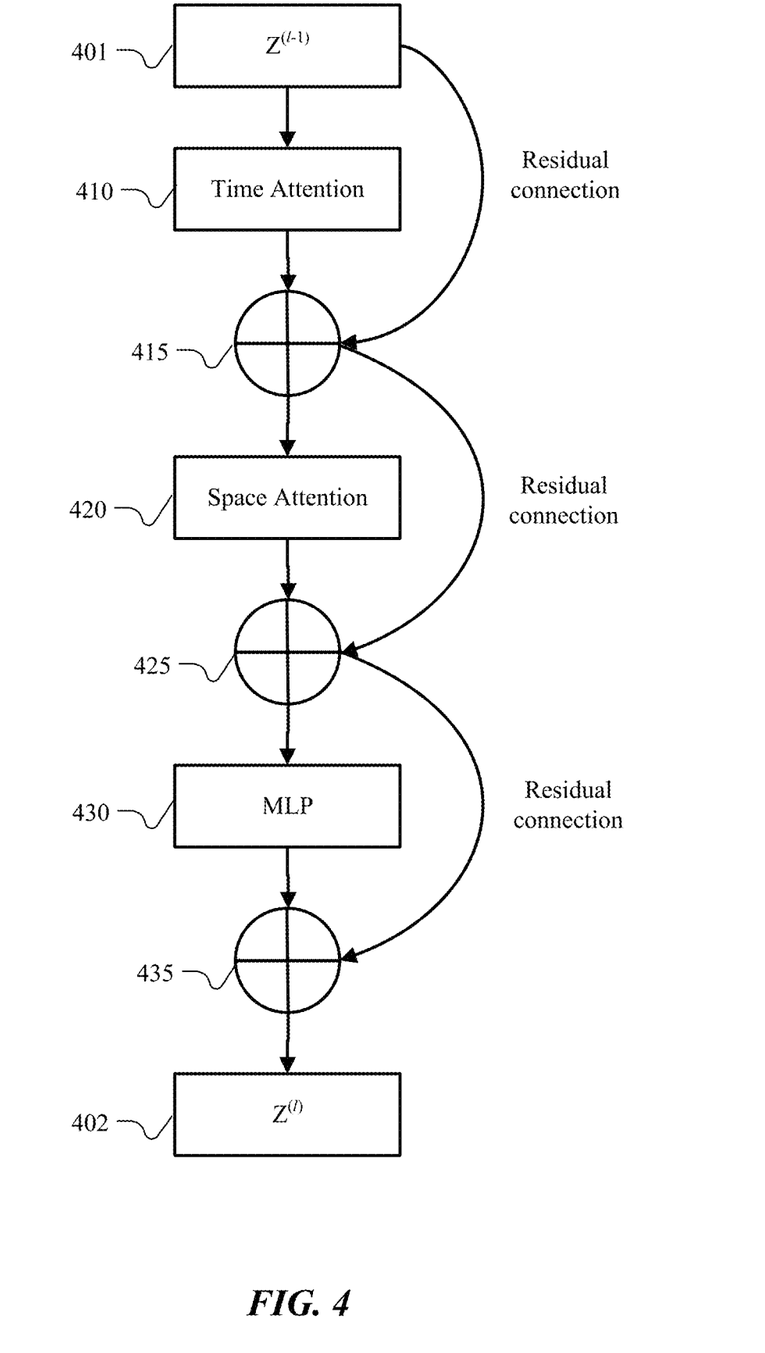
FIG. 4 illustrates an example logic diagram for an encoding block.

In particular embodiments, the computing device 101 may generate an embedding vector $z_{(p,t)}^{(l)}$ corresponding to the particular patch based on the computed temporal attention and the computed spatial attention at block l of the L encoding blocks. To generate the embedding vector $z_{(p,t)}^{(l)}$ corresponding to the particular patch based on the computed temporal attention and the computed spatial attention, the computing device 101 may process the computed temporal attention and the computed spatial attention using a 1-hidden-layer MLP. FIG. 4 illustrates an example logic diagram for an encoding block. The embedding vectors $z^{(l-1)}$ 401 generated by block l-1 of the L encoding block may be provided to block l of the L encoding blocks. At 410, the computing device 101 may compute a time attention for each patch using the equation for $\alpha_{(p,t)}^{(l,a)time}$. At 415, the computing device 101 may compute $z'_{(p,t)}^{(l)time}$ for each patch by combining the embedding vector $z_{(p,t)}^{(l-1)}$ 401 with the output of the time attention at 410. At 420, the computing device 101 may compute a space attention for each patch using the equation for $\alpha_{(p,t)}^{(l,a)space}$. At 425, the computing device 101 may compute $z'_{(p,t)}^{(l)space}$ by combining $z'_{(p,t)}^{(l)time}$ computed at 415 with the output of the space attention at 420. At 430, the computing device 101 may compute MLP (LN $(z'_{(p,t)}^{(l)space})$) using a 1-hidden-layer MLP. At 435, the computing device 101 may generate an embedding vector $z_{(p,t)}^{(l)}$ 402 for each patch by combining $z'z_{(p,t)}^{(l)space}$ with the output of 435. Although this disclosure describes generating an embedding vector for each patch in a particular manner, this disclosure contemplates generating an embedding vector for each patch in any suitable manner.

In particular embodiments, the computing device 101 may generate a classification embedding 120 by taking a layer normalization on one or more of embedding vectors generated at a last encoding block of the L encoding blocks. As an example and not by way of limitation, the computing device 101 may take a layer normalization on the embedding vector $z_{(0,0)}^{(L)}$ corresponding to the classification token generated at the last block of the L embedding block to generate the classification embedding 120. The embedding vector $z_{(0,0)}^{(L)}$ corresponding to the classification token in the last encoding block may be taken as the global representation of the stream of video frames 110 and may be used for classification. Although this disclosure describes generating a classification embedding in a particular manner, this disclosure contemplates generating a classification embedding in any suitable manner.

In particular embodiments, the computing device 101 may determine a class 130 of the stream of video frames 110 based on the generated classification embedding 120. To determine the class of the stream of video frames, the computing device may process the classification embedding using a 1-hidden-layer MLP 105A of the self-attention-based machine-learning model 105. Although this disclosure describes determining a class of a stream of video frames based on a generated classification embedding in a particular manner, this disclosure contemplates determining a class of a stream of video frames based on a generated classification embedding in any suitable manner.

Figure 5:
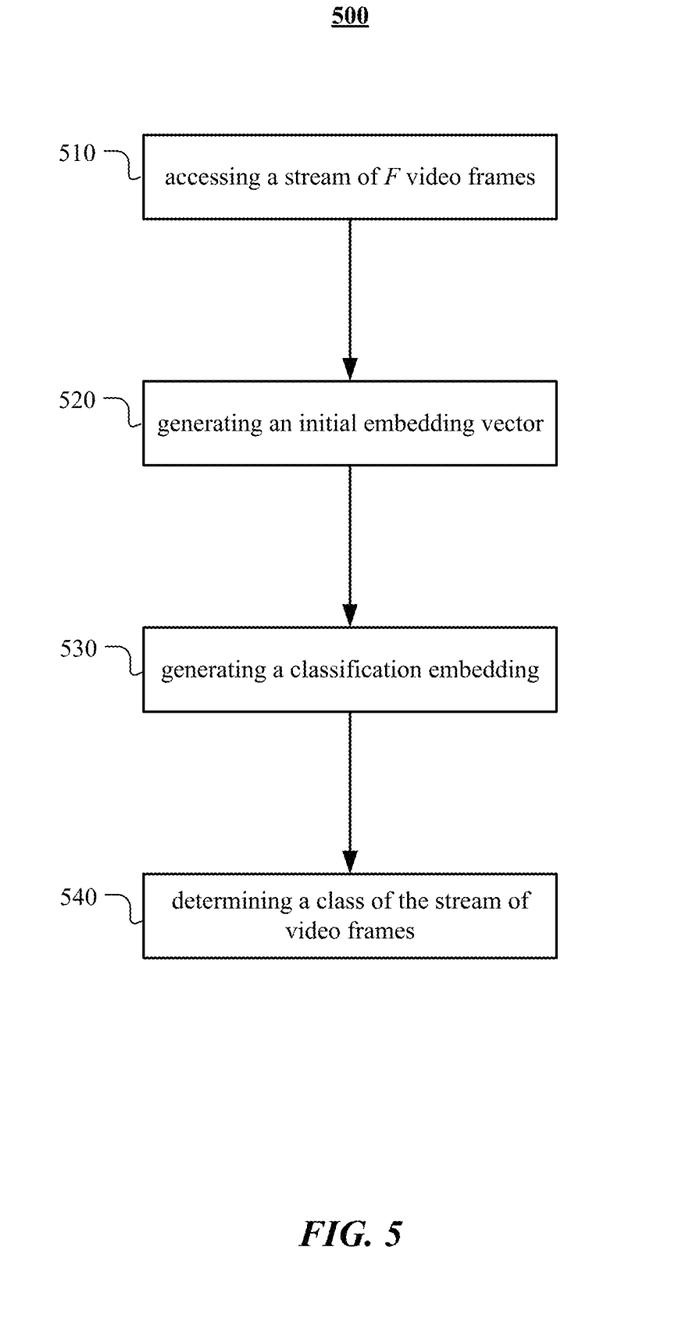
FIG. 5 illustrates an example method for classifying a stream of video frames using a self-attention-based machine-learning model.

FIG. 5 illustrates an example method 500 for classifying a stream of video frames using a self-attention-based machine-learning model. The method may begin at step 510, where the computing device 101 may access a stream of F video frames. Each of the F video frames may comprise N patches that are non-overlapping. At step 520, the computing device 101 may generating an initial embedding vector for each of the N×F patches in the F video frames. At step 530, the computing device 101 may generate a classification embedding by processing the generated N×F initial embedding vectors using a self-attention-based machine-learning model that computes a temporal attention and a spatial attention for each of the N×F patches. The temporal attention and the spatial attention of a particular patch in a particular video frame of the F video frames may be computed by comparing information associated with the particular patch with information associated with (1) patches in other video frames of the F video frames and (2) other patches in the particular video frame. At step 540, the computing device 101 may determine a class of the stream of video frames based on the generated classification embedding. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for classifying a stream of video frames using a self-attention-based machine-learning model including the particular steps of the method of FIG. 5, this disclosure contemplates any suitable method for classifying a stream of video frames using a self-attention-based machine-learning model including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
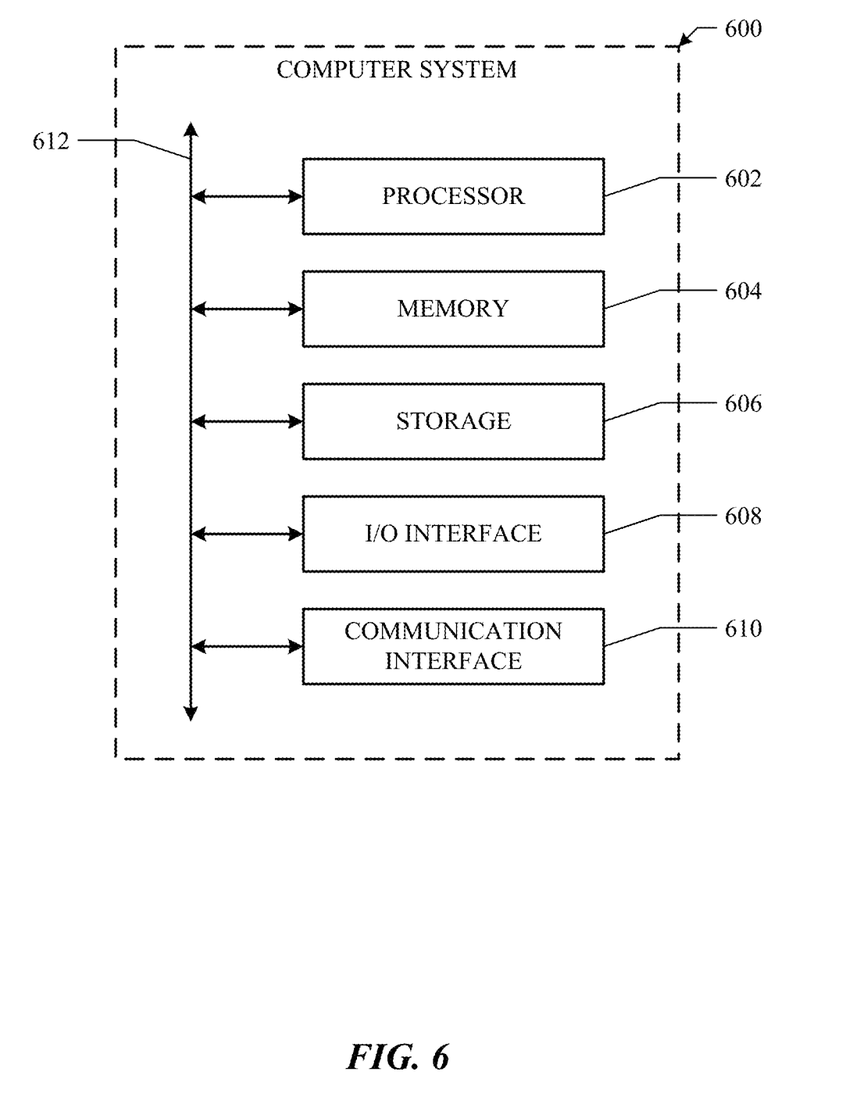
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
    accessing a stream of F video frames, wherein the F video frames comprises N patches that are non-overlapping;
    generating, for N×F patches in the F video frames, an initial embedding vector;
    generating a classification embedding by processing generated N×F initial embedding vectors using a self-attention-based machine-learning model that computes a temporal attention and a spatial attention for the N×F patches, wherein the temporal attention and the spatial attention of a particular patch in a particular video frame of the F video frames are computed by comparing information associated with the particular patch with information associated with (1) patches in other video frames of the F video frames and (2) other patches in the particular video frame; and
    determining a class of the stream of video frames based on the generated classification embedding.

2. The method of claim 1, wherein the generated N×F initial embedding vectors are provided to the self-attention-based machine-learning model as input, wherein the self-attention-based machine-learning model comprises L serial encoding blocks.

3. The method of claim 2, wherein the computing device generates embedding vectors corresponding to the N×F patches at blocks of the L serial encoding blocks based on embedding vectors generated at a preceding block of the L serial encoding blocks.

4. The method of claim 3, wherein generating an embedding vector corresponding to the particular patch in the particular video frame at block l of the L serial encoding blocks comprises:
    computing a temporal attention based on comparisons between the embedding vector corresponding to the particular patch generated at block l-1 of the L serial encoding blocks and other embedding vectors corresponding to the patches in the other video frames generated at block l-1;
    computing a spatial attention based on comparisons between the embedding vector corresponding to the particular patch generated at block l-1 and additional embedding vectors corresponding to the other patches in the particular video frame generated at block l-1; and
    generating an embedding vector corresponding to the particular patch based on the computed temporal attention and the computed spatial attention.

5. The method of claim 4, wherein the patches in the other video frames comprises patches at a spatial location of the particular patch in their corresponding video frames.

6. The method of claim 4, wherein generating the embedding vector corresponding to the particular patch based on the computed temporal attention and the computed spatial attention comprises processing the computed temporal attention and the computed spatial attention using a multilayer perceptron (MLP).

7. The method of claim 3, wherein the classification embedding is generated by taking a layer normalization on one or more of embedding vectors generated at a last block of the L serial encoding blocks.

8. The method of claim 3, wherein the L serial encoding blocks are multi-headed.

9. The method of claim 1, wherein determining a class of the stream of video frames comprises processing the classification embedding using a multilayer perceptron (MLP).

10. The method of claim 1, wherein generating an initial embedding vector corresponding to a patch comprises:
    creating a color embedding vector by multiplying color information of the patch with a color information embedding matrix; and
    adding a positional embedding vector to the color embedding vector.

11. The method of claim 10, wherein the color information embedding matrix is trained during a training procedure, and wherein the positional embedding vector is trained during the training procedure.

12. The method of claim 1, wherein the self-attention-based machine-learning model is a Transformer network.

13. One or more computer-readable non-transitory storage media embodying software that is operable when executed to:
    access a stream of F video frames, wherein the F video frames comprises N patches that are non-overlapping;
    generate, for N×F patches in the F video frames, an initial embedding vector;
    generate a classification embedding by processing generated N×F initial embedding vectors using a self-attention-based machine-learning model that computes a temporal attention and a spatial attention for the N×F patches, wherein the temporal attention and the spatial attention of a particular patch in a particular video frame of the F video frames are computed by comparing information associated with the particular patch with information associated with (1) patches in other video frames of the F video frames and (2) other patches in the particular video frame; and determine a class of the stream of video frames based on the generated classification embedding.

14. The media of claim 13, wherein the generated N×F initial embedding vectors are provided to the self-attention-based machine-learning model as input, wherein the self-attention-based machine-learning model comprises L serial encoding blocks.

15. The media of claim 14, wherein the media embodying the software is further operable when executed to generate embedding vectors corresponding to the N×F patches at blocks of the L serial encoding blocks based on embedding vectors generated at a preceding block of the L serial encoding blocks.

16. The media of claim 15, wherein generating an embedding vector corresponding to the particular patch in the particular video frame at block l of the L serial encoding blocks comprises:
 computing a temporal attention based on comparisons between the embedding vector corresponding to the particular patch generated at block l-1 of the L serial encoding blocks and other embedding vectors corresponding to the patches in the other video frames generated at block l-1;
 computing a spatial attention based on comparisons between the embedding vector corresponding to the particular patch generated at block l-1 and additional embedding vectors corresponding to the other patches in the particular video frame generated at block l-1; and
 generating an embedding vector corresponding to the particular patch based on the computed temporal attention and the computed spatial attention.

17. The media of claim 16, wherein the patches in the other video frames comprises patches at a spatial location of the particular patch in their corresponding video frames.

18. The media of claim 16, wherein generating the embedding vector corresponding to the particular patch based on the computed temporal attention and the computed spatial attention comprises processing the computed temporal attention and the computed spatial attention using a multilayer perceptron (MLP).

19. The media of claim 15, wherein the classification embedding is generated by taking a layer normalization on one or more of embedding vectors generated at a last block of the L serial encoding blocks.

20. A system comprising:
 one or more processors; and
 a non-transitory memory coupled to the one or more processors comprising instructions executable by the one or more processors, the one or more processors operable when executing the instructions to:
 access a stream of F video frames, wherein the F video frames comprises N patches that are non-overlapping;
 generate, for N×F patches in the F video frames, an initial embedding vector;
 generate a classification embedding by processing generated N×F initial embedding vectors using a self-attention-based machine-learning model that computes a temporal attention and a spatial attention for the N×F patches, wherein the temporal attention and the spatial attention of a particular patch in a particular video frame of the F video frames are computed by comparing information associated with the particular patch with information associated with (1) patches in other video frames of the F video frames and (2) other patches in the particular video frame; and
 determine a class of the stream of video frames based on the generated classification embedding.

* * * * *